United States Patent
Wolflin

[15] 3,658,251
[45] Apr. 25, 1972

[54] NON-PLUGGING SPRINKLER

[72] Inventor: George L. Wolflin, 7326 South Gretna Avenue, Whittier, Calif. 90606

[22] Filed: Mar. 19, 1970

[21] Appl. No.: 21,134

[52] U.S. Cl. ........................................239/228, 239/DIG. 1
[51] Int. Cl. ...........................................................B05b 3/00
[58] Field of Search ....................239/228, 110, 251, DIG. 1

[56] References Cited

UNITED STATES PATENTS

| | | | |
|---|---|---|---|
| 1,639,389 | 8/1927 | Todd | 239/228 |
| 436,592 | 9/1890 | Baker et al. | 239/228 |
| 469,023 | 2/1892 | Broichgans | 239/228 |

Primary Examiner—Lloyd L. King
Attorney—Christie, Parker & Hale

[57] ABSTRACT

A rotary sprinkler is described having a hub with a pair of arms extending radially from the hub and terminating in at least partly tangentially directed nozzles for inducing sprinkler rotation. In each arm between the hub and the nozzle is a debris trap comprising a vertical cylinder having a diagonal baffle between the inlet and the outlet. An aperture through the baffle near the top of the cylinder permits water to flow from the inlet to the outlet. The water inlet is near the top of the cylinder and the water outlet is near the bottom of the cylinder on the opposite side of the baffle. Centrifugal force as the sprinkler rotates forces debris having a density greater than water into a region formed between the diagonal baffle and the cylinder wall so that the debris is not carried into the nozzle to cause plugging. The diagonal baffle also defines a pocket or region radially inwardly in from the passage through the baffle wherein debris having lower density than water tends to accumulate, further protecting the nozzle from plugging.

9 Claims, 3 Drawing Figures

PATENTED APR 25 1972 3,658,251
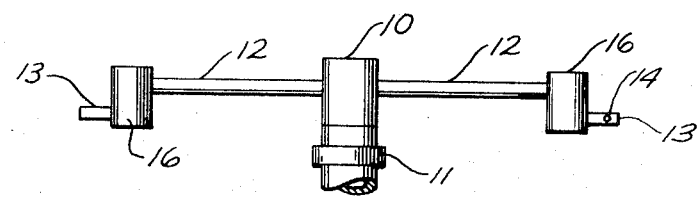
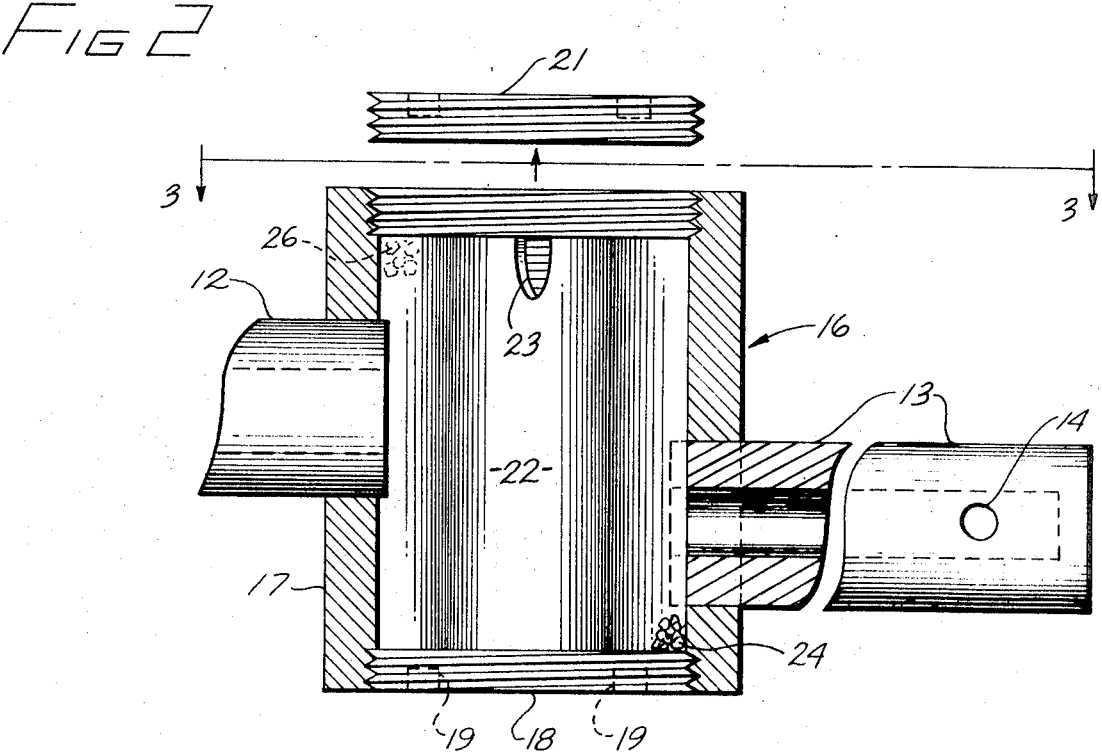
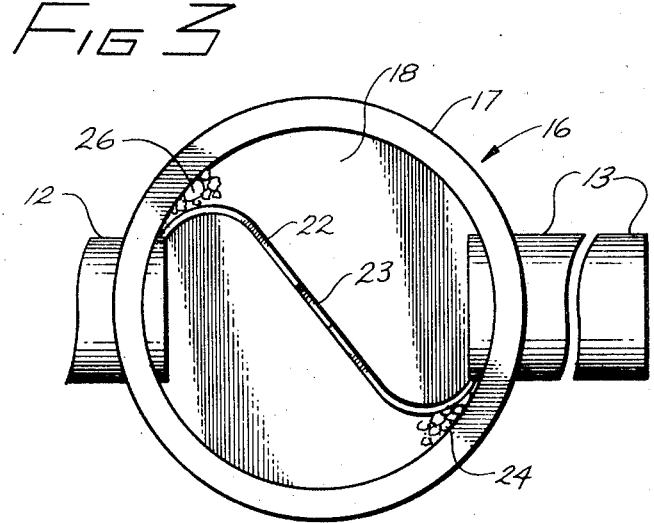
INVENTOR.
GEORGE L. WOLFLIN
BY
Christie, Parker & Hale
ATTORNEYS

NON-PLUGGING SPRINKLER

BACKGROUND

Rotary sprinklers having a plurality of radially extending arms, and nozzles on the arms for directing water outwardly and at least partly tangentially, are widely used in agricultural watering. The force of water ejected from the sprinkler nozzles causes the sprinkler head to rotate rapidly and distribute water over a large area. In order to obtain uniform water distribution, nozzles at the ends of the arms are provided with one or more relatively small orifices for obtaining a desired water distribution pattern. Many agricultural water supplies have substantial amounts of particulate debris, mostly sand, small stones and the like. When such debris enters a rotary sprinkler, it may plug the relatively small nozzle orifices so that no water is ejected. This is a significant problem in many situations, such as, for example, in orchards where sprinklers are permanently installed and operated by timers or other automatic mechanisms so that the sprinkling system operates over long periods of time without manual attendance or inspection.

Various types of screens, either in the sprinklers themselves or in the inlet to the sprinkling system, have been tried for removing solid debris and preventing plugging of sprinklers; however, these have not been entirely satisfactory since the screens themselves tend to become plugged when particularly dirty water is employed in the irrigation system. Screens are also somewhat difficult to clean.

It is, therefore, desirable to provide a rotary sprinkler including means for preventing plugging of the water nozzles without the use of screens or similar filters.

BRIEF SUMMARY OF THE INVENTION

Therefore, in practice of this invention according to a preferred embodiment there is provided means for preventing plugging of a rotary sprinkler nozzle comprising a debris trapping chamber between a sprinkler hub and nozzle. A baffle in the chamber between the inlet and the outlet and including a passage through the baffle defines a debris trapping region in the chamber on the inlet side of the baffle relatively further from the inlet than the passage whereby centrifugal force of the sprinkler during rotation throws sand and similar debris radially outwardly so that it collects in the chamber and does not readily pass to the sprinkler nozzles.

DRAWINGS

These and other features and advantages of the invention will be appreciated as the same becomes better understood by reference to the following detailed description of a presently preferred embodiment when considered in connection with the accompanying drawings wherein:

FIG. 1 illustrates a rotary sprinkler incorporating principles of this invention;

FIG. 2 is a side cutaway of a debris trap in the sprinkler of FIG. 1; and

FIG. 3 is a top view of the debris trap of FIG. 2 with its top open.

Throughout the drawings like numerals refer to like parts.

DESCRIPTION

FIG. 1 illustrates a substantially conventional rotary sprinkler having a debris trap incorporating principles of this invention. As illustrated in this embodiment, a central hub 10 is mounted on a conventional bearing 11 which can be connected to a water supply pipe or the like (not shown). The bearing permits free rotation of the hub when the sprinkler is operated. Extending substantially radially from the hub 10 are a pair of sprinkler arms 12, each of which is substantially identical to the other. In some embodiments, the arms 12 are merely straight tubes extending radially, or in other embodiments, a bend may be provided within each arm between its ends. If desired, three or more arms may be used.

At the end of each of the arms 12 is a conventional nozzle 13 having an aperture 14 through which water flows, and the aperture is directed at least partially tangentially relative to the axis of rotation of the sprinkler so that the force of water ejected from the nozzles 13 causes the sprinkler to rapidly rotate on the bearing, thereby casting water over a large area. It will be apparent to one skilled in the art that many types of conventional nozzles can be employed for obtaining a desired pattern of water distribution.

In between the hub 10 and the nozzle 13 in each of the arms is a debris trap 16 which is also illustrated in vertical cutaway in FIG. 2, and further illustrated in a top view in FIG. 3. As illustrated in this embodiment, the trap 16 comprises a cylinder 17 having a substantial vertical axis and an appreciably larger cross section than the cross section of the water flow passages to the nozzle. The larger cross section results in the water velocity within the cylindrical chamber being lower than in the passages so that debris can be removed by centrifugal force as the sprinkler operates. The bottom of the cylinder 17 is closed by a threaded plug 18 having spanner holes 19, or if desired, a screwdriver slot so that the plug can be installed or removed as desired. In a similar manner, the top of the cylinder is closed by a removable plug 21. By so providing, the top or bottom plug, or both, can be removed for discharging debris from the trap.

Within the cylinder 17 is a vertical baffle 22 in the form of an S-shaped sheet of metal that is sprung for insertion into the cylinder and, therefore, resiliently engages the sides of the cylinder so as to be tightly fixed in place. The baffle 22 is preferably in engagement with the bottom plug 18, or if there is a slight space between the bottom of the baffle and the plug, this space should be narrower than the diameter of the nozzle orifice. The top of the baffle is preferably engaged or nearly engaged with the top plug 21 so that no debris can pass around the ends of the baffle. An aperture 23 forms a water passage near the top part of the baffle 22. In the illustrated embodiment, the aperture is a slot or notch in the baffle plate, or if desired it can be a hole through the baffle near its top. The cross section or hydraulic capacity of the aperture 23 through the baffle plate is larger than the cross section or hydraulic capacity of the nozzle orifice 14.

The water inlet from the arm 12 comes through the side of the cylinder 17 on one side of the baffle plate and near the top of the cylinder. The water outlet to the nozzle 13 is on the opposite side of the baffle plate from the water inlet and is preferably at the bottom of the cylinder.

During operation, water ejected from the nozzles 13 causes the sprinkler to rotate about the hub 10. The rotation of the sprinkler causes a substantial centrifugal force at the ends of the arms and this centrifuging action tends to throw sand, small stones and the like having a higher density than water toward the outer end of the sprinkler arms. The water from the arm 12 enters the enlarged chamber formed by the cylinder 17 and decreases in velocity due to the larger cross section available for flow. The centrifuging action causes the heavier particles of debris to travel to the outer portion of the chamber on the inlet side of the baffle where the debris accumulates in the pocket or region formed between the baffle plate 22 and the wall of the cylinder 17. Being heavier than the water, the higher density sand and other debris settles toward the bottom and collects in the corners as illustrated at 24 in FIGS. 2 and 3. Accumulations of sand in the corner 24 can be removed by removing one or both of the end plugs in the cylinder.

The baffle plate 22 divides the cylinder into two enlarged portions and the centrifugal action of the rotating arms also tends to separate solid debris having a lower density than water by propelling the water to the outer portion of the second chamber and permitting the lighter debris to accumulate in a corner 26 near the top and inner side of the cylinder. It will be noted that substantially less volume is available within the cylinder for retaining lightweight debris; however, this is no disadvantage since the principal solid debris in irrigation water is normally sand and the like having a higher density than water. Lightweight debris, such as wood chips, is rather rare in most irrigation water.

It is preferred in operation of a sprinkler as herein described that the arms 12 be relatively short and the nozzle orifices oriented so that the sprinkler rotates as rapidly as possible. This is preferred since the centrifugal force acting on the debris is directly proportional to the radius and to the square of the rotational speed. Any decrease in length of the arm that increases the speed of rotation is therefore advantageous. By the same token, it is preferred that the debris traps be located at the outer ends of the arms as near the nozzle as possible in order to increase the radius at which the centrifugal force operates.

The water inlet from the arm 12 into the cylinder 17 is preferably at the top so that the flow of water into the cylinder does not impinge directly on the debris accumulated near the bottom on the inlet side of the baffle. This helps prevent the debris from becoming entrained in the flowing water and being carried to the nozzle 13. It is preferred that the outlet to the nozzle be located at the lower portion of the second portion of the chamber so that lightweight debris floating in the upper region on the outlet side of the baffle plate is less likely to be entrained and carried to the nozzle.

In some sprinkling systems there may be a substantial elevation difference between some of the sprinklers and others in the system and water may drain from the higher sprinklers when the system is not in operation. If there is any substantial amount of lightweight debris, that is debris having a lower density than water, floating in the second chamber of debris trap, such debris could be carried down and into the nozzle with the possibility of plugging of the nozzle when the water is again turned on. Such a possibility is effectively avoided by providing a partly upwardly directed passage from the trap to the nozzle so that the nozzle orifice is at a slightly higher elevation than the outlet from the chamber. In this way, any debris floating in the chamber is always above the entrance to the outlet, and the possibility of sweeping the lightweight debris into the nozzle is significantly alleviated.

Many modifications and variations of the present invention will be apparent to one skilled in the art. Thus, for example, the illustrated debris trap is in the form of a cylinder with an S-shaped baffled plate inserted. This is preferred since the manufacture and assembly of such a unit is economical. Another suitable arrangement has a cylinder with a baffle plate formed integrally with the cylinder, in which case, the baffle plate may merely be straight across instead of S-shaped and diagonally arranged relative to the principle extent of the arm 12 and can be canted relative to the vertical to provide increased debris trapping volume. A cylinder is preferred since it is readily tapped for plugs; however, it will be apparent that rectangular or other geometries can be employed if desired. It will also be noted that it is not necessary that a pair of plugs be provided in order to permit cleaning of the debris trap. Many other modifications and variations will be apparent, and it is, therefore, to be understood that within the scope of the appended claims the invention may be practiced otherwise than as specifically described.

What is claimed is:

1. A rotary sprinkler comprising:
   a hub including means for permitting rotary motion;
   a plurality of arms extending generally radially from the hub;
   a water aperture adjacent the end of each arm; and
   means on each arm intermediate the hub and the aperture for separating solids having lower density than water and solids having a greater density than water from water in response to centrifugal force of rotation of the sprinkler comprising:
   a first enlarged portion of the arm;
   a first solids trapping region in the first enlarged portion radially nearer the hub than a direct flow path of water through the enlarged portion for separating solids having a lower density than water;
   a second enlarged portion in the arm serially arranged with the first enlarged portion; and
   a second solids trapping region in the second enlarged portion radially further from the hub than a direct flow path of water through the enlarged portion for separating solids having a greater density than water.

2. A rotary sprinkler as defined in claim 1 wherein the first and second enlarged portions comprise:
   a chamber in the arm;
   a baffle in the chamber diagonal to the principal extent of the arm, dividing the chamber into the first and second enlarged portions; and
   orifice means through the baffle adjacent its upper portion for passing water through the baffle.

3. A rotary sprinkler comprising:
   a hub including means for permitting rotary motion;
   a plurality of arms extending generally radially from the hub;
   a water aperture adjacent the end of each arm;
   an enlarged cylindrical chamber having a substantially vertical axis in each arm intermediate the hub and the aperture for separating solids from water in response to centrifugal force of rotation of the sprinkler;
   a baffle in the chamber diagonal to the principal extent of the arm, dividing the chamber into a first enlarged portion in the arm defining a solids trapping region in the enlarged portion radially further from the hub than a direct flow path of water through the first enlarged portion, and a second enlarged portion in the arm serially arranged with the first enlarged portion defining a second solids trapping region in the second enlarged portion radially nearer the hub than a direct flow path of water through the second enlarged portion;
   orifice means through the baffle adjacent its upper portion for passing water through the baffle;
   water inlet means into the cylinder near its top on one side of the baffle; and
   water outlet means from the cylinder near its bottom on the other side of the baffle.

4. Means for preventing plugging of a rotary sprinkler nozzle comprising:
   a chamber;
   inlet means for connecting the chamber to a rotary sprinkler for water inlet;
   outlet means for connecting the chamber to a nozzle for water outlet, the outlet means being on substantially the opposite side of the chamber from the inlet means; and
   a baffle in the chamber between the inlet and the outlet including a passage through the baffle defining a debris trapping region in the chamber on the inlet side of the baffle relatively further from the inlet means than the passage; and wherein
   the baffle comprises a member arranged diagonally with respect to a line between the inlet means and the outlet means, and the passage through the baffle is remote from the bottom of the chamber.

5. A combination as defined in claim 4 wherein the chamber comprises a cylinder having a generally vertical axis; and
   the baffle comprises a substantially vertical member and wherein the passage through the baffle comprises a notch in the top of the baffle.

6. Means for preventing plugging of a rotary sprinkler nozzle comprising:
   a cylinder having a generally vertical axis;
   inlet means near the top portion of the cylinder for connecting the cylinder to a rotary sprinkler for water inlet;
   outlet means for connecting the cylinder to a nozzle for water outlet, the outlet means being on substantially the opposite side of the cylinder from the inlet means; and
   a diagonal, substantially vertical baffle in the cylinder between the inlet means and the outlet means including a passage through the baffle adjacent its top defining a debris trapping region in the chamber on the inlet side of the baffle relatively further from the inlet means than the passage; and wherein the outlet means is near the bottom portion of the cylinder on the opposite side of the baffle from the inlet means.

7. A combination as defined in claim 6 further comprising an end plug in the cylinder for removing debris trapped therein.

8. a combination as defined in claim 6 wherein the baffle comprises an S-shaped sheet having edge portions in engagement with sides of the cylinder.

9. A rotary sprinkler comprising;
a hub including means for permitting rotary motion;
a plurality of arms extending generally radially from the hub;
a water aperture adjacent the end of each arm; and
means on each arm intermediate the hub and the aperture for separating solids having lower density than water and solids having a greater density than water from water in response to centrifugal force of rotation of the sprinkler comprising:
an enlarged chamber in the arm;
a baffle in the chamber diagonal to the principal extent of the arm, dividing the chamber into a first solids trapping region in the chamber radially further from the hub than a direct flow path through the chamber for separating solids having a greater density than water and a second solids trapping region in the chamber radially nearer the hub than a direct flow path of water through the chamber for separating solids having a lower density than water; and
orifice means through the baffle adjacent its upper portion for passing water through the baffle.

* * * * *